US006008711A

United States Patent [19]

Bolam

[11] Patent Number: 6,008,711

[45] Date of Patent: Dec. 28, 1999

[54] METHOD AND ARRANGEMENT FOR SECURING A CURRENT TRANSFORMER TO AN ELECTRIC UTILITY METER HOUSING

[75] Inventor: Charles Bolam, Lafayette, Ind.

[73] Assignee: Siemens Power Transmission & Distribution, Wendell, N.C.

[21] Appl. No.: 09/005,107

[22] Filed: Jan. 9, 1998

[51] Int. Cl.$^{6}$ .............................. H01F 27/06; C01G 9/00

[52] U.S. Cl. .............................. 336/92; 336/65; 324/107; 324/127

[58] Field of Search .................................... 324/104, 156, 324/157, 142, 76, 11; 336/92, 65, 174, 175; 361/602, 603, 620, 623, 663; 439/332, 334, 725, 550, 574, 518

[56] References Cited

U.S. PATENT DOCUMENTS

| | | | |
|---|---|---|---|
| 3,634,878 | 1/1972 | Davis | 336/192 |
| 4,083,000 | 4/1978 | Becker | 324/137 |
| 4,104,588 | 8/1978 | Westberry | 324/110 |
| 4,105,985 | 8/1978 | Plunkett | 336/90 |
| 4,121,147 | 10/1978 | Becker et al. | 324/104 |
| 4,363,014 | 12/1982 | Leach et al. | 336/90 |
| 4,368,424 | 1/1983 | Miller | 324/142 |
| 4,390,225 | 6/1983 | Coyne et al. | 339/88 R |
| 4,413,230 | 11/1983 | Miller | 324/142 |
| 4,550,967 | 11/1985 | Riches et al. | 339/88 R |
| 4,623,865 | 11/1986 | Kiesel et al. | 336/65 |
| 4,763,072 | 8/1988 | Katoh et al. | 336/229 |
| 4,887,029 | 12/1989 | Hemminger | 324/142 |
| 5,173,657 | 12/1992 | Holdsclaw | 324/142 |
| 5,214,403 | 5/1993 | Bogaerts et al. | 336/84 C |
| 5,590,179 | 12/1996 | Shincovich et al. | 379/107 |
| 5,828,283 | 10/1998 | Choi et al. | 336/200 |
| 5,853,300 | 12/1998 | Robinson et al. | 439/517 |

*Primary Examiner*—Michael L. Gellner
*Assistant Examiner*—Anh Mai
*Attorney, Agent, or Firm*—Maginot, Addison & Moore

[57] ABSTRACT

An arrangement for securing a current transformer to an electric utility meter housing. The arrangement includes a utility meter base plate which forms a portion of the electric utility meter housing. The utility meter base plate includes (i) a first central axis and (ii) a transformer receptacle defined therein. The transformer receptacle has an opening and a first retention surface. The arrangement also has a current transformer assembly including (i) the current transformer and (ii) a wall member affixed to the current transformer. The wall member defines an annular channel having a second central axis, and the current transformer is positioned within the annular channel. The transformer assembly also includes a tab having a second retention surface. The tab extends from the wall member. The current transformer assembly is secured to the utility meter base plate, such that the first central axis is substantially parallel with the second central axis, when the tab is disposed within the transformer receptacle so that the first retention surface engages the second retention surface. An associated method of securing a current transformer to an electric utility meter is also disclosed.

17 Claims, 8 Drawing Sheets

METHOD AND ARRANGEMENT FOR SECURING A CURRENT TRANSFORMER TO AN ELECTRIC UTILITY METER HOUSING

FIELD OF THE INVENTION

The present invention relates generally to electric utility meters, and more particularly to a method and arrangement for securing a current transformer to an electric utility meter housing.

BACKGROUND OF THE INVENTION

Electric utility meters, or simply meters, are devices, that among other things, measure electrical energy consumed by a residence, factory, commercial establishment or other such facility. Electrical utilities rely on meters for many purposes, including billing customers and tracking demand for electrical power. A common form of meter utilizes current transformers to sense the electrical current being supplied to the facility being metered. The current sensed by the current transformers is transmitted to circuit boards included in the meter to facilitate measurement of the amount of electrical energy being consumed by the facility.

Heretofore, current transformers have been positioned inside of and secured to meter housings in a variety of ways. For example, one way of securing a current transformer to a meter housing involves attaching a post to a meter base plate within the housing and then inserting the post through a hole defined in the center of the current transformer. The current transformer is then retained on the post by pressing a nut over the end of the post. Alternatively, the end of the post may be melted such that the melted end bonds with the current transformer thereby retaining the current transformer on the post.

Although the above described methods for securing a current transformer to a meter are commonly used, they do have significant disadvantages. For example, melting the end of the post, or having to push a nut over the end thereof, requires manufacturing steps that increase the complexity of manufacturing the meter. In addition, the use of such methods to secure the current transformers within the meter housing inhibits the ability to service the meter. In particular, if a current transformer must be replaced in the meter, then a service technician can encounter difficulty in removing the existing current transformer and inserting a new current transformer. Specifically, if the melting method was utilized for securing the current transformer, the melted end of the post must be cut off before the current transformer can be removed from the post within the meter housing. Once the post end is cut off, it cannot be easily reused, and often the entire meter base plate must be replaced. If, however, a nut was used to secure the current transformer, then the nut must be carefully removed from the post to avoid damaging the current transformer. Carefully removing the nut to avoid damaging the current transformer results in a technician spending additional time disassembling the meter which also increases the cost of servicing the meter.

There exists a need, therefore, for a method and arrangement for securing a current transformer to an electric utility meter housing which addresses one or more of the above discussed problems.

SUMMARY OF THE INVENTION

The present invention fulfills the above need, as well as others, by providing a current transformer assembly having a wall with one or more tabs for inserting into corresponding receptacles in the utility meter base plate. Each tab includes a retention surface that engages a retention surface in the corresponding receptacle to secure the current transformer to the base plate. By employing tabs and corresponding transformer receptacles, no extra pieces, such as nuts, are needed. Moreover, utilizing tabs and transformer receptacles to secure the current transformer to the base plate eliminates the extra step of melting an end of a retaining post.

In accordance with a first embodiment of the present invention, there is provided an arrangement for securing a current transformer to an electric utility meter housing. The arrangement includes a utility meter base plate which forms a portion of the utility meter housing. The utility meter base plate includes a transformer receptacle defined therein, the transformer receptacle having an opening and a first retention surface. The arrangement also has a current transformer assembly including (i) the current transformer, (ii) a wall member affixed to the current transformer, and (iii) a tab having a second retention surface which extends from the wall member. The current transformer assembly is secured to the utility meter base plate by disposing the tab within the transformer receptacle so that the first retention surface engages the second retention surface.

In accordance with another embodiment of the present invention, there is provided a method of securing a current transformer to an electric utility meter housing having a base plate. The base plate has a transformer receptacle defined therein and the transformer receptacle includes an opening and a first retention surface. The current transformer is disposed within a current transformer assembly that includes a wall member affixed to the current transformer and a tab extending from the wall member. The tab includes a second retention surface. The method includes the steps of (i) positioning the current transformer assembly such that the tab is disposed proximate the opening, (ii) effecting movement of the current transformer assembly such that the tab traverses the opening, and (iii) causing plastic deformation of at least one of the tab and the transformer receptacle to facilitate traversal of the opening by the tab so as to position the tab in the transformer receptacle such that (A) the first retention surface engages the second retention surface and (B) the current transformer assembly is secured to the utility meter base plate.

The above discussed features and advantages, as well as others, will become more readily apparent to those of ordinary skill in the art by reference to the following detailed description and accompanying drawings

DETAILED DESCRIPTION

Figure 1:
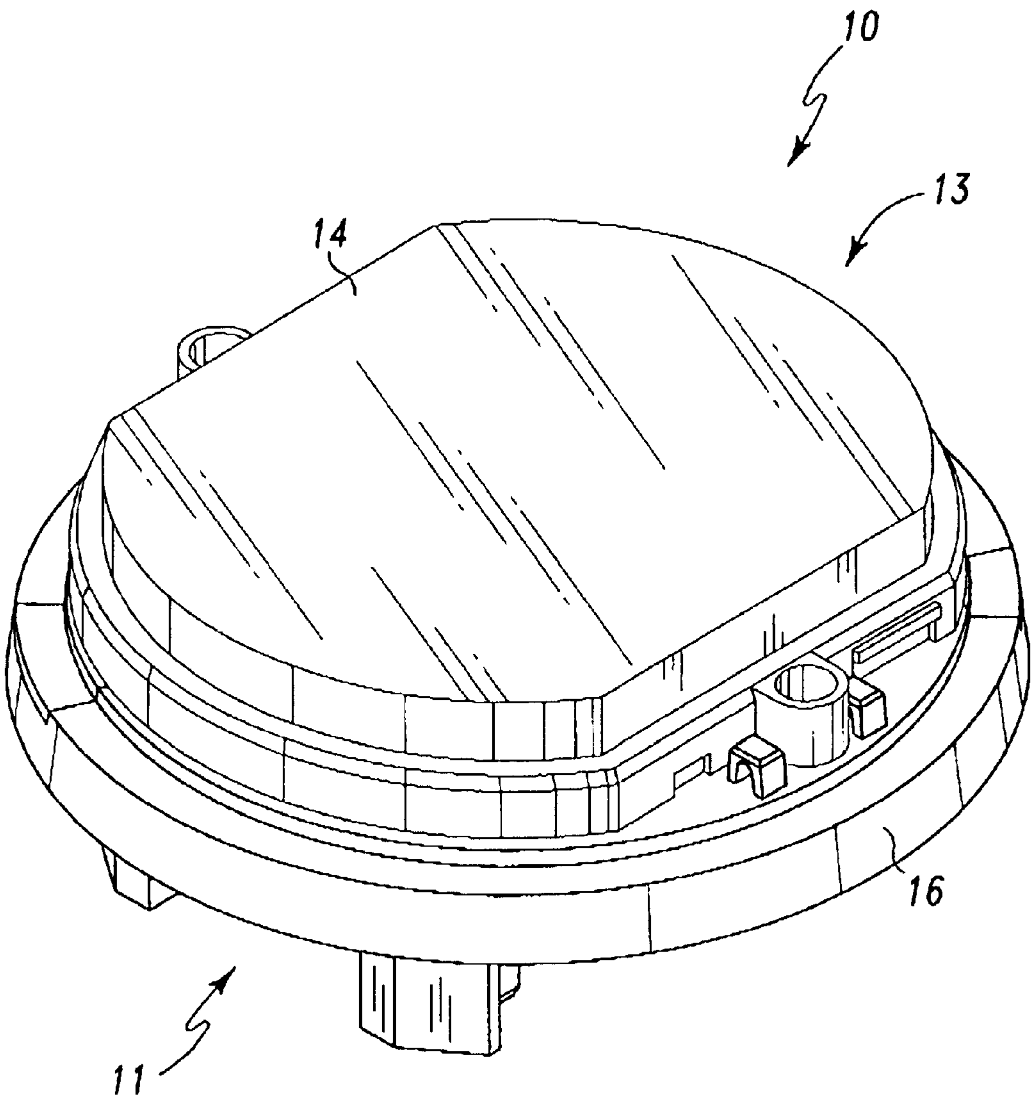
FIG. 1 is a perspective view of an electric utility meter which incorporates the features of the present invention therein.
Figure 2:
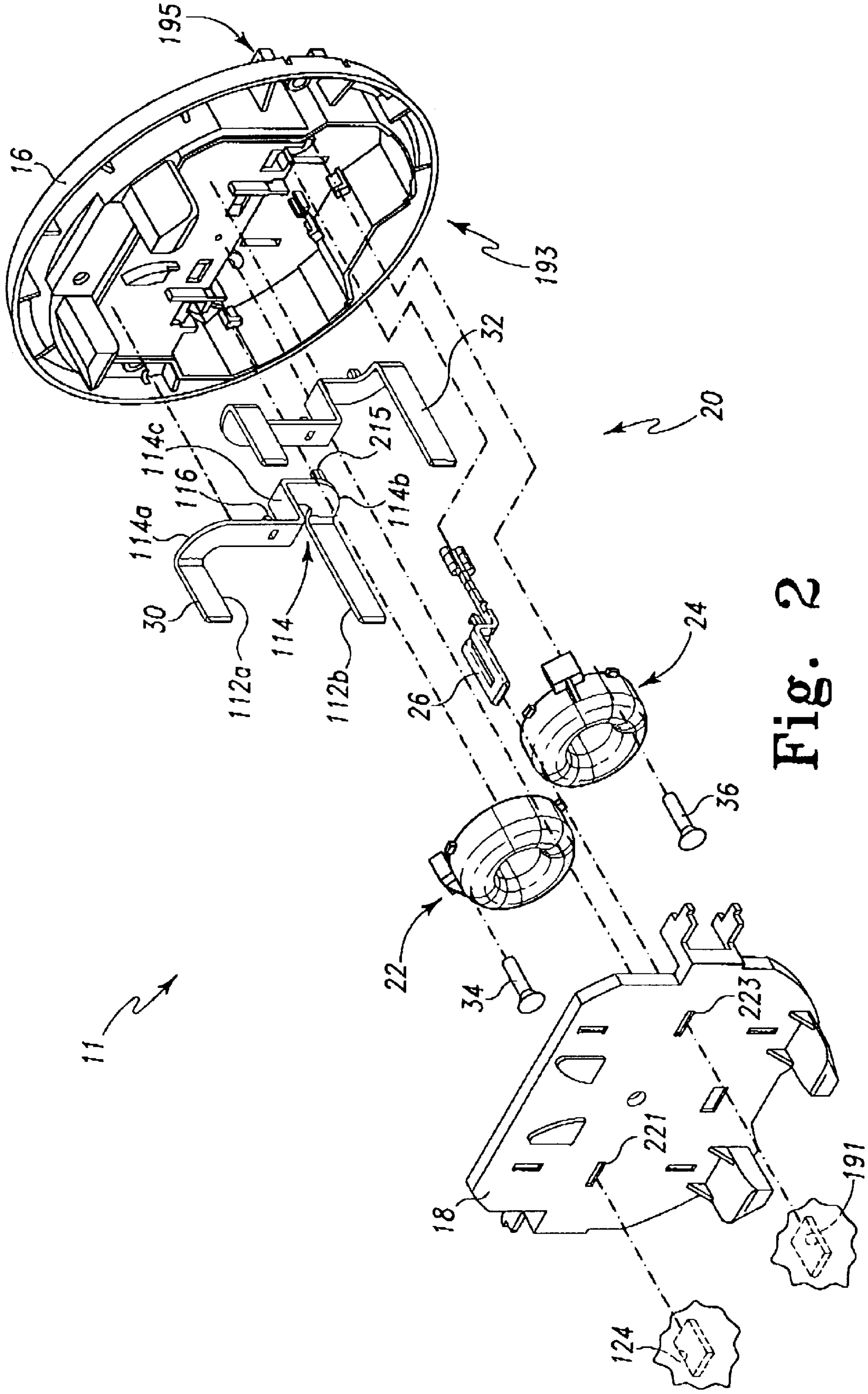
FIG. 2 is an exploded view of a sensor module the electric utility meter of FIG. 1 (note that a fragmentary view of a pair of electric utility meter socket plugs are shown for clarity of description)

Referring now to FIGS. 1 and 2, there is shown an exemplary embodiment of an electric utility meter 10 which incorporates the features of the present invention therein. The electric utility meter 10 in the embodiment described herein is a modular meter that includes a sensor module 11 and a measurement module 13. In general, the sensor module includes circuitry that generates signals representative of voltage and current on the electrical system being metered. These signals are provided to the measurement module 13, which develops energy consumption measurement information from the voltage and current signals. A description of the operation of the circuitry of the sensor module 11 and measurement module 13 to generate energy consumption measurement information may be found in U.S. Pat. No. 08/862,844, filed May 23, 1997 U.S. Pat. No. 5,843,697, which is incorporated herein by reference.

In any event, it will be noted that the description of the present invention in the context of the present embodiment in no way limits the application of the invention to modular meters. Those of ordinary skill in the art may readily incorporate the features of the present invention in electric utility meters of standard (non-modular) configurations.

Referring again to FIGS. 1 and 2, the sensor module 11 includes a meter housing that comprises a utility meter base plate 16 and a back cover plate 18. The sensor module 11 further comprises a sensor assembly 20 that is contained within the meter housing, or in other words, disposed between the utility meter base plate 16 and the back cover plate 18. The sensor assembly 20 includes a pair of current transformer assemblies 22 and 24, a contact blade 26, and a pair of current coils 30 and 32.

In general, the sensor assembly 20 operates in the following manner to generate voltage and current measurement signals. In a typical meter installation, the current coils 30 and 32 are serially connected to the power lines of the facility being metered. In other words, all of the current drawn by the facility passes through the current coils 30 and 32. The current transformer assemblies 22 and 24 each include current transformers which are disposed in a current sensing relationship with respect to the current coils 30 and 32. The current transformers within the assemblies 22 and 24 generate a scaled down version of the current passing through the current coils. The scaled down current constitutes the current measurement signal, which is provided to the measurement module 13. In addition, the current coils 30 and 32 each are connected to the measurement module 13 to provide a voltage measurement signal thereto. Accordingly, in this example, the voltage measurement signal constitutes the actual voltage on the power lines. Finally, the contact blade 26 in this exemplary embodiment provides a neutral line connection to the measurement module 13 which is typically used as a reference for the voltage measurement signals.

In accordance with the one embodiment of the present invention, the components of the sensor assembly 20 are secured to the meter housing in a manner that facilitates simplified manufacturing techniques, lower part counts, and ease of post-manufacturing servicing. To this end, as described below, the meter 10 of the present invention includes a novel arrangement for securing current coils 30 and 32, the current transformers 22 and 24, and the current blade to the meter housing, and particularly, the meter base plate 16.

Figure 3:
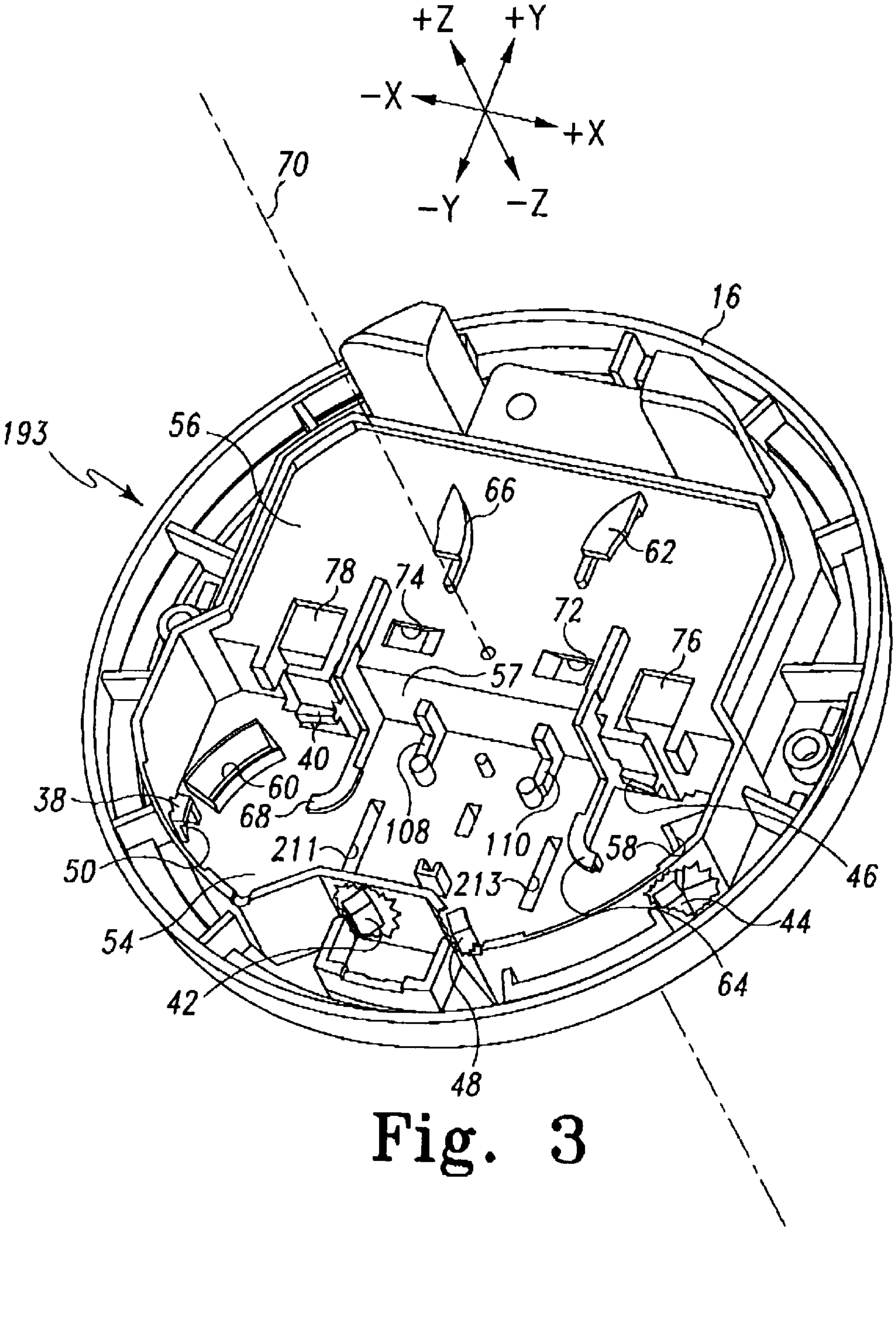
FIG. 3 is an enlarged fragmentary perspective view of the utility meter base plate of the electric utility meter of FIG. 1.

As shown in FIG. 3, the utility meter base plate 16 includes a first side 193 and a second side 195 (see FIG. 2). In the present embodiment, the utility meter base plate 16 provides an interface between the sensor module 11 and the measurement module 13. The sensor assembly 20 is generally secured to the first side 193, but provides electrical connections to the second side 195 to facilitate electrical connection to the measurement module 13.

The first side 193 has a lower floor 54 and an upper floor 56 formed thereon. The upper floor 56 is spaced apart from the lower floor 54 along central axis 70 such that a wall segment 57 connects the upper floor 56 to the lower floor 54. In a preferred embodiment, the utility meter base plate 16 including the lower floor 54, the upper floor 56, and the wall segment 57 are integrally formed, such as from a piece of molded plastic.

The upper floor 56 has a pair of coil receptacles 66 and 62 attached thereto. In a preferred embodiment, the coil receptacles are integrally formed with the upper floor 56. The upper floor 56 also has a pair of apertures 72 and 74 defined therein. In addition, the upper floor 56 has a pair of blade receptacles 76 and 78 defined therein. Details regarding the blade receptacles 76 and 78 are provided further below in connection with the discussion of FIGS. 8, 9 and 10.

The lower floor 54 has a number of transformer receptacles attached thereto. Specifically, the lower floor 54 has transformer receptacles 38, 40, 42, 44, 46, and 48 attached thereto, which are preferably integrally formed with the lower floor 54. The lower floor 54 also has a pair of conduits 58 and 60 defined therein. The conduits 58 and 60 extend through the utility meter base plate 16 such that the side 193 is in communication with the side 195 (see FIG. 2) via the conduits 58 and 60. The lower floor 54 also has a pair of slits 211 and 213 defined therein. The slits 211 and 213 extend all the way through the utility meter base plate 16 such that the side 193 is in communication with the side 195 (see FIG. 2) via slits 211 and 213. The lower floor 54 also has a pair of coil receptacles 64 and 68 attached thereto. In addition, the lower floor 54 has a pair of protrusions 108 and 110 extending upward therefrom.

During assembly of the meter 10, the various components of the sensor assembly 20 (see FIG. 2) are secured to the utility meter base plate 16 using above described features. In particular, the current coils 30 and 32 are first secured to the utility meter base plate 16. To this end, the current coil 30 (FIG. 2) is positioned such that features thereof engage the coil receptacles 66 and 68 (FIG. 3). Likewise the current coil 32 is positioned such that features thereof engage each of the coil receptacles 58 and 62. Further detail regarding the structure of the current coils 30 and 32, as well as their assembly onto the base plate 16, is provided further below.

Once the current coils 30 an 32 are assembled onto the base plate 16, the current transformers 22 and 24 are inserted over an end of the current coils 30 and 32, respectively and secured to the base plate 16. To this end, the current transformer 22 (FIG. 2) is positioned such that features thereof engage the transformer receptacles 38, 40 and 42 (FIG. 3), and the current transformer 24 (FIG. 2) is positioned such that features thereof engage the transformer receptacles 44, 46 and 48. Further detail regarding the structure of the current transformers 22 and 24, as well as their assembly onto the base plate 16, is provided further below in connection with the description of FIGS. 4, 5 and 6..

While the current coils 30 and 32 must be secured to the base plate before the current transformers 22 and 24, the contact blade 26 may be secured to the base plate 16 at any time. In general, the contact blade 26 is inserted into the blade receptacle 76, which secures the contact blade 26 to the base plate 16. Further detail regarding the structure of the contact blade 26, as well as its assembly onto the base plate 16, is provided further below.

As will be discussed more fully below, the assembly of the current transformers 22 and 24, the current coils 30 and 32, and the contact blade 26 onto the meter base plate 16 using the arrangements according to the present invention reduces overall meter component cost as well as complexity of manufacture and maintenance.

The first components of the sensor assembly 20 discussed in detail are the current coils 30 and 32. The following description is specifically directed to the current coil 30 component of the electrical assembly 20, however, it should be appreciated that the current coil 32 is substantially identical to current coil 30. As shown in FIG. 2, the current coil 30 is an elongated and multiply-bent piece of conductive metal, such as copper, that has a substantially uniform thickness and width. The current coil 30 includes a center section 114 having a pair of bends along the width of the current coil which define an upper floor portion 114*a* for engaging the upper floor 56, a lower floor portion 114*b* for engaging the lower floor 54 and a wall segment portion 114*c* for engaging the wall segment 57. The center section 114 terminates at either end by a bend along the thickness of the current coil 30 and the a bend along the width of the current coil.

The bend along the width of the coil at either end of the center section 14 defines a first and second current coil blades 112*a* and 112*b* of the current coil 30. The first and second current blades 112*a* and 112*b* are configured to be received by corresponding current jaws of a standard utility meter socket, not shown, but which are well known in the art. The current coil 30 also includes a detent 116 extending from the upper floor portion 114*a*, and a faston 215 extending from the lower floor portion 114*b*.

Figure 5:
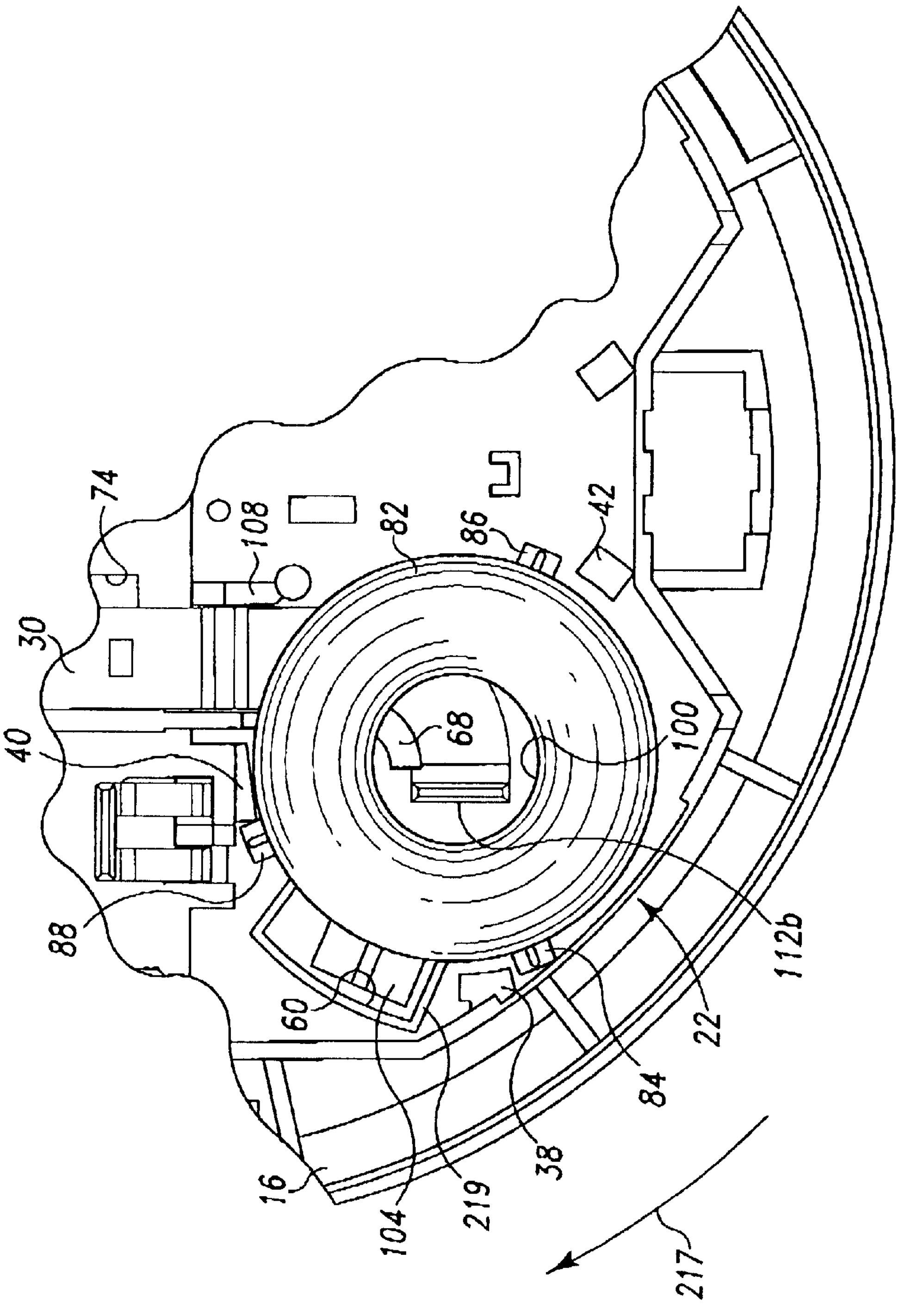
FIG. 5 is an enlarged fragmentary front elevational view of the utility meter base plate of the electric utility meter of FIG. 1, showing the current transformer assembly positioned thereon such that the tabs of the current transformer are radially aligned with the transformer receptacles.

Referring now to FIGS. 2, 3, and 5, the current coil 30 is secured to the utility meter base plate 16 in the following manner. The current coil 30 is placed on the utility meter base plate 16 such that the upper floor portion 114*a* and the lower floor portion 114*b* thereof are respectively aligned adjacent and external to the coil receptacles 66 and 68. The current coil 30 is displaced from the coil receptacles 66 and 68 in a direction indicated by the negative y coordinate. The current coil 30 is moved in the direction indicated by the positive y coordinate until at least a part of the lower floor portion 114*b* engages the coil receptacle 68 and at least a part of the upper floor portion 114*a* engages the coil receptacle 66. Such engagement forces the current coil 30 inward, in other words, toward, the utility meter base plate 16 as it continues to travel in the direction indicated by the positive y coordinate. Because the current coil 30 is forced inward by the combined action of the coil receptacles 66 and 68, the current coil 30 and/or the utility meter base plate 16 must elastically deform to allow the detent 116 of the current coil 30 to traverse the upper floor 56 in the positive y direction. When the current coil 30 is in the proper position relative to the utility meter base plate 16, the detent 116 releases into the aperture 74 (see FIG. 5).

It shall be noted that the slit 211 is of suitable dimensions such that the faston 215 extends into the slit 211 of the utility meter base plate 16 at all times while the current coil 30 is moved in the positive y direction during assembly.

Once the current coil 30 is positioned relative to the utility meter base plate 16 in the above described manner, the coil receptacle 66 and the protrusion 108 inhibits the current coil 30 from moving relative to the utility meter base plate 16 in the directions indicated by the positive x and z coordinates. Moreover, the coil receptacle 68 inhibits the current coil 30 from moving relative to the utility meter base plate 16 in the directions indicated by the negative x and positive z coordinates. In addition, the aperture 74 engages the detent 116 to inhibit the current coil 30 from moving relative to the utility meter base plate 16 in the negative y direction. Finally, the wall segment 57 inhibits the current coil 30 from moving relative to the utility meter base plate 16 in the positive y direction. Accordingly, the current coil 30 is securely attached to the utility meter base plate 16 once the current coil 30 is positioned such that the detent 116 release into the aperture 74.

So installed, the current blades 112*a* and 112*b* are position with respect to the meter housing such that the current blades 112*a* and 112*b* are aligned in registration with the current jaws of a standard utility meter socket, not shown, when the meter 10 is properly positioned within such a socket. The current blades 112*a* and 112*b* provide the electrical connection to the power lines of the facility being metered through the current jaws.

The current coil 30 may furthermore be detached from the utility meter base plate 16 by forcing the detent 116 from the aperture 74 and then removing the upper floor portion 114*a* from the coil receptacle 66 and the lower floor portion 114*b* from the coil receptacle 68.

It should be further understood that current coil 32 (see FIG. 2) cooperates with coil receptacle 62, coil receptacle 64, protrusion 110, and aperture 72 in a manner substantially identical the that described above for current coil 30 so as to secure current coil 32 to utility meter base plate 16.

Once the current coils 30 and 32 are secured to the utility meter base plate 16, the current transformer assembly 22 is secured to the utility meter base plate 16 as described further below. It will be appreciated that the above method of securing the current coils 30 and 32 to the utility meter base plate 16 reduces the complexity of manufacturing. For example, using an interference fit between the current coil 30 and the receptacles 66 and 68, as well as elastic deformation of the current coil 30 and/or the utility meter base plate 16 to allow the detent 116 to snap into and be retained by the aperture 74, allows the current coil 30 to be secured to the utility meter base plate 16 without any additional parts or procedures.

In an alternative embodiment, the current coils 30 and 32 may be secured to the utility meter base plate 16 using one or more screws. Such an embodiment would eliminate the need for the receptacles 58, 62, 66 and 68 as well as the apertures 72 and 74. However, such an embodiment would not provide the part count reduction and manufacturing step reduction afforded by the main embodiment described above.

The current transformers 22 and 24, as well as the arrangement for securing them to the utility meter housing, and specifically, the utility meter base plate 16, is now described in detail. The following descriptions are respectively directed to the transformer receptacle 38 and the blade receptacle 78, however it should be understood that (i) each transformer receptacle attached to the lower floor 54 (i.e. transformer receptacles 40, 42, 44, 46, and 48) is substantially identical to the transformer receptacle 38, and (ii) the blade receptacle 76 is substantially identical to blade receptacle 78.

Figure 7:
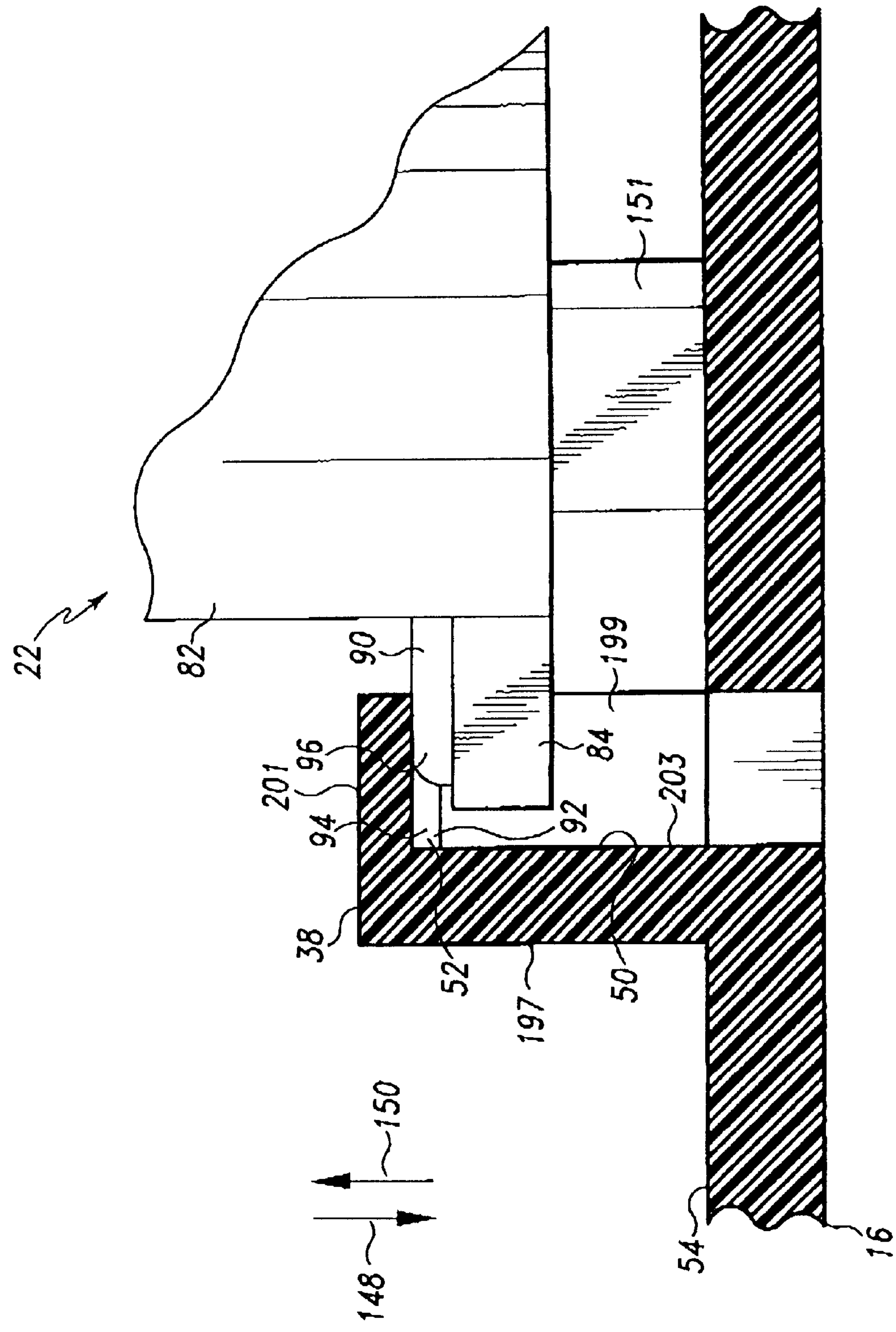
FIG. 7 is an enlarged fragmentary cross sectional view of the transformer receptacle taken along the line 7—7 of FIG. 6 as view in the direction of the arrows, showing a tab positioned within the transformer receptacle.

Referring now to FIGS. 3 and 7, the transformer receptacle 38 includes an opening 50 defined by a back wall 197, a side wall 199, a top wall 201 and the lower floor 54. In particular, the back wall 197 extends upwardly from the lower floor 54 to the top wall 201, and terminates on one side at the side wall 199. The side wall 199 is preferably disposed perpendicular to the back wall 197 and also extends from the lower floor 54 of the utility meter base plate 16 to the top wall 201. The top wall 201 is substantially rectangular and has dimensions that extend the length of the back wall 197 and the length of the side wall 199. The top wall 201 has a cavity 92 defined therein. The cavity 92 defines a channel that extends perpendicularly from the back wall 197, substantially parallel to the side wall 199. The channel of the cavity 92 defines a first channel wall 94 and a second channel wall which is disposed opposite of the first channel wall 94 but is not shown in the views of FIGS. 3 and 7. The first channel wall 94 defines a retention surface 52. The second channel wall also defines a retention surface which is not shown but is disposed opposite the retention surface 52.

The following description is specifically directed to the current transformer assembly 22 component of the electrical assembly 20, however, it should be appreciated that the current transformer assembly 24 is substantially identical to current transformer assembly 22.

Figure 4:
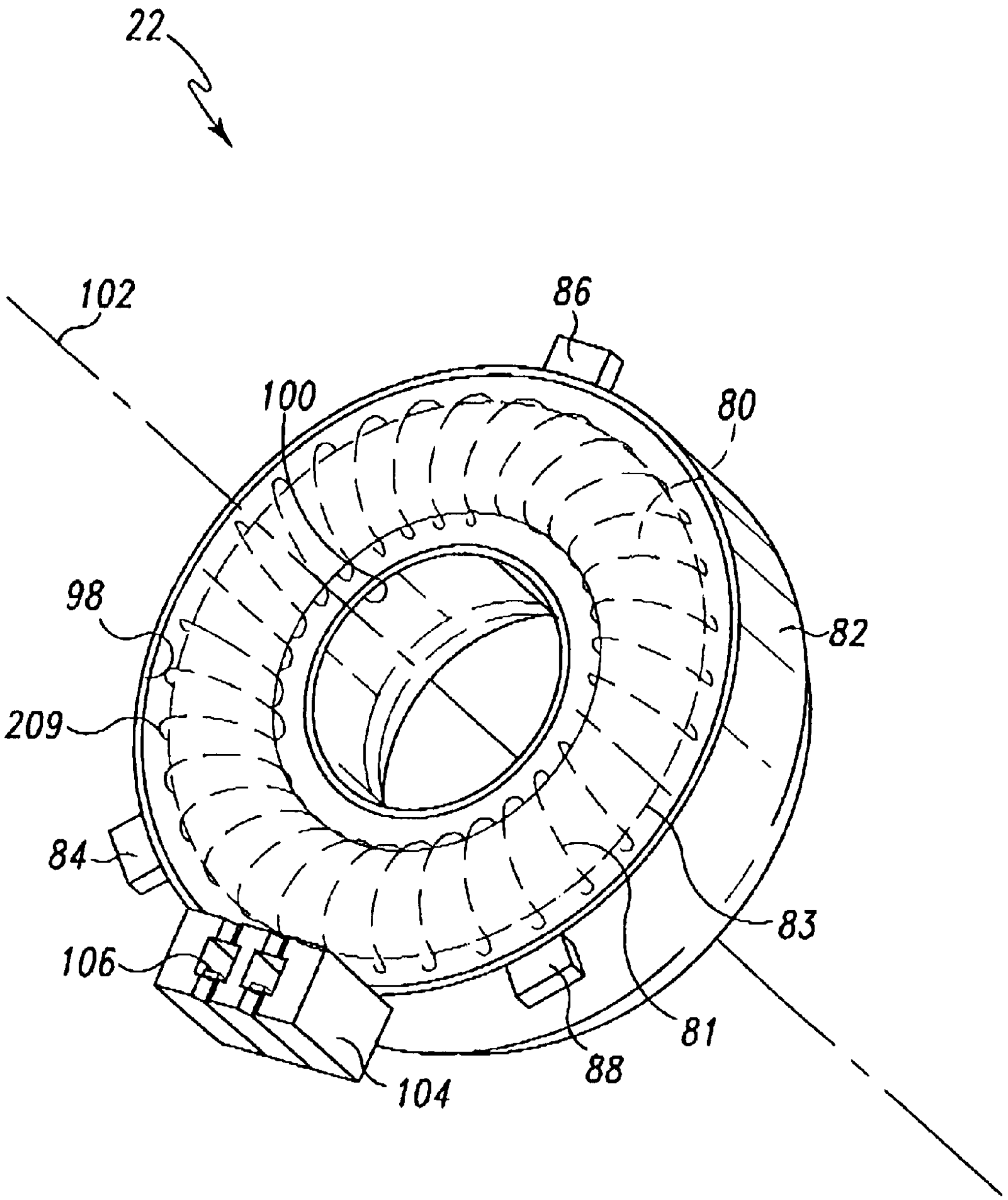
FIG. 4 is an enlarged perspective view of the current transformer assembly of the electric utility meter of FIG. 1.

Referring now to FIGS. 4, 5, and 7, the current transformer assembly 22 includes a wall member 82, a current transformer 80, a plurality of tabs 84, 86, and 88, and a connector housing 104 having a connector 106 disposed therein. The wall member 82 is shaped so as to define an annular channel 98 having a central axis 102. The wall member 82 is further shaped so as define a center aperture 100.

The current transformer 80 is a toroidal inductive device comprising a winding 81 wrapped around an annular magnetic core 83. As is well known in the art, the current transformer 80 actually operates in conjunction with a conductor passing through the center aperture, which is the current coil 30 in this embodiment, to generate a signal representative of the current passing through the current coil 30.

In any event, the current transformer 80 is positioned within the annular channel 98 and a resin 209 is disposed over the current transformer 80 so as to affix the current transformer 80 to the wall member 82. Each tab 84, 86, and 88 is integrally formed with, and extends from, the wall member 82. As shown in FIGS. 5 and 7, the tab 84 has a detent 90 formed thereon which defines a retention surface 96. It should be understood that the tabs 86 and 88 also have detents formed thereon which define retention surfaces therein. The connector housing 104 is also integrally formed with, and extends from, the wall member 82. The connector 106 is positioned within the connector housing 104 and is electrically connected to the winding 81 of the current transformer 80.

Figure 6:
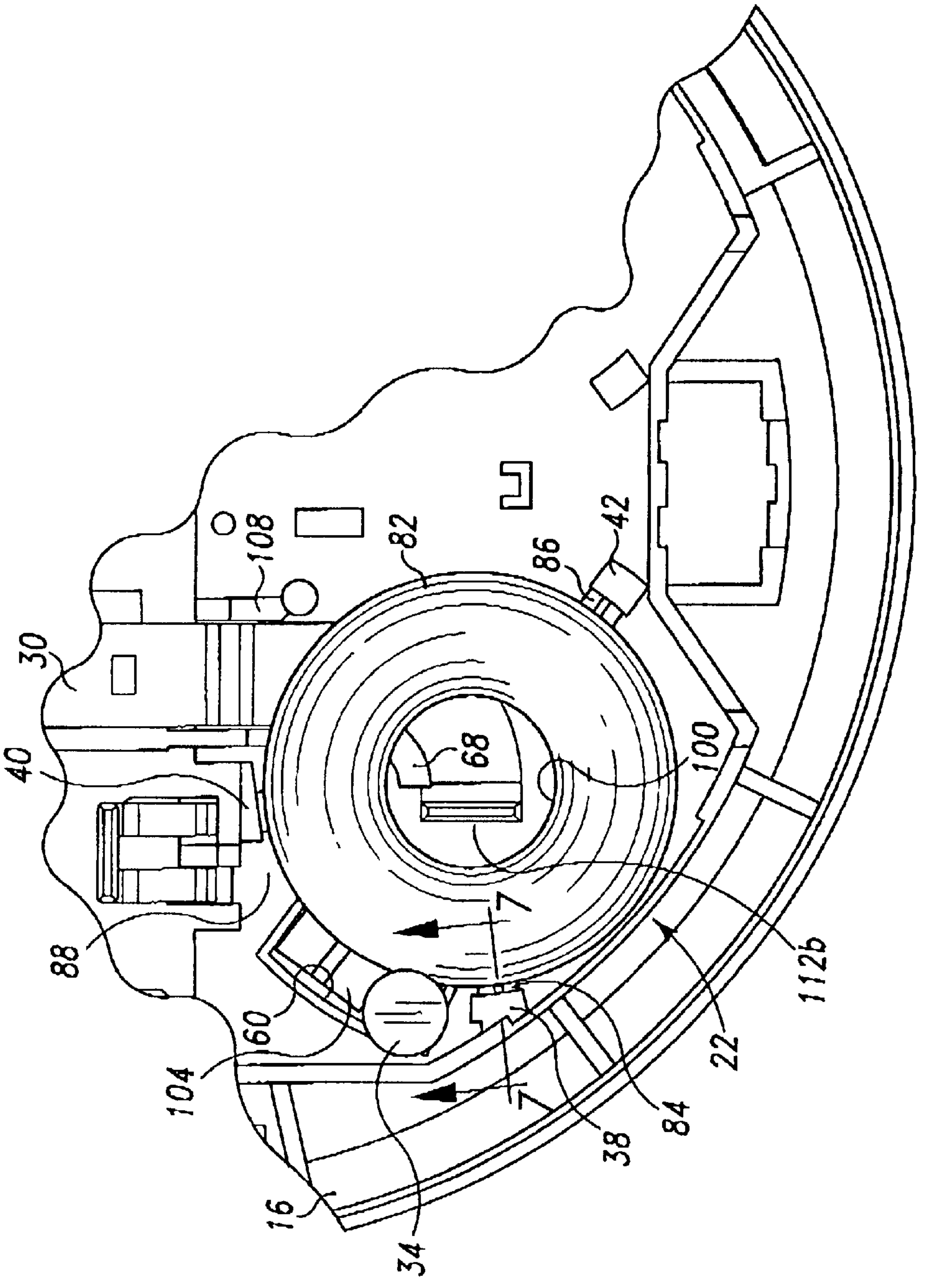
FIG. 6 is an enlarged fragmentary front elevational view of the utility meter base plate of the electric utility meter of FIG. 1, showing the current transformer assembly positioned thereon such that the tabs of the current transformer are positioned within the transformer receptacles.

The current transformer assembly 22, as discussed above, is secured to the meter base plate 16 after the current coil 30 is secured to the meter base plate 16. Reference is made to FIGS. 5 and 6 to describe the method of securing the transformer assembly to the utility meter base plate 16 in accordance with the present invention.

As shown in FIGS. 5 and 6, the current transformer assembly 22 is positioned relative to the utility meter base plate 16 such that each tab 84, 86, and 88 is aligned radially adjacent to the corresponding transformer receptacle 38, 42, or 40. In particular, as clearly shown in FIG. 5, the tab 84 is aligned radially adjacent to the transformer receptacle 38, the tab 88 is aligned radially adjacent to the transformer receptacle 40, and the tab 86 is aligned radially adjacent to the transformer receptacle 42. In addition, the current transformer assembly 22 is further positioned relative to the utility meter base plate 16 such that the connector housing 104 extends into the conduit 60.

The current transformer assembly 22 is still further positioned relative to the utility meter base plate 16 such that the current transformer assembly 22 rests on a support member 151 (see FIG. 7) and a wall 219 (see FIG. 5) surrounding the conduit 60. Once so positioned and aligned, the current transformer assembly 22 is rotated relative to the utility meter base plate 16 in a direction indicated by arrow 217 such that the tab 84 traverses the opening 50 (see FIG. 3) of the transformer receptacle 38 and becomes positioned within the transformer receptacle 38 (see FIG. 6). The above described rotation of the current transformer assembly 22 also causes the tab 88 to traverse the opening (not shown) of the transformer receptacle 40 and become positioned therein (see FIG. 6). In addition, the tab 86 traverses the opening (not shown) of the transformer receptacle 42 and becomes positioned therein (see FIG. 6).

During the aforementioned rotation of the current transformer 22, plastic deformation of the tab 84 and/or the receptacle 38 allows the detent 90 on the tab 84 to traverse the top wall 201 until the detent 90 seats within the cavity 92. Once seated, as shown in FIG. 7, the tab 84 and/or the receptacle 38 releases or recovers its original shape. In such a position, the retention surface 96 defined on the detent 90 of the tab 84 engages the both retention surface 52 and the opposing retention surface, not shown, of transformer receptacle 38.

It should also be appreciated that the tabs 88 and 86 respectively cooperate with transformer receptacles 40 and 42 in a substantially identical manner as that described above for tab 84 and transformer receptacle 38 (i.e. tab 88 has a retention surface which engages retention surfaces positioned within transformer receptacle 40, and tab 86 has a retention surface which engages retention surfaces positioned within transformer receptacle 42). Once tabs 84, 88, and 86 are respectively positioned within transformer receptacles 38, 40, and 42 in the above described manner, the current transformer assembly 22 is secured to the utility meter base plate 16.

In addition, after rotating the current transformer assembly 22 in the above described manner, an optional stop member 34 may be positioned within the conduit 60 adjacent to the connector housing 104. The stop member 34 may suitably be a small, substantially dumbbell shaped piece of plastic material configured to fit loosely in the conduit 60. Positioning the optional stop member 34 in the above described manner helps inhibit the rotation of the current transformer assembly 22 relative to the utility meter base plate 16 in a direction opposite to the direction indicated by the arrow 217 (see FIG. 5) and thus decreases the likelihood that the tabs 84, 88, and 86 will come out of their corresponding transformer receptacles 38, 40, and 42.

As shown in FIG. 6, positioning and securing the current transformer assembly 22 to the utility meter base plate 16 in the above described manner results in the current blade 112*b* of the current coil 30 extending through center aperture 100 such that current transformer 80 (see FIG. 4) is disposed in a current sensing relationship with the current coil 30.

In addition, positioning and securing the current transformer assembly 22 to the utility meter base plate 16 in the above described manner results in the central axis 102 (see FIG. 4) of the current transformer assembly 22 being in a substantially parallel relationship with the central axis 70 of the utility meter base plate 16. In other words, the current transformer assembly is horizontally disposed with respect to the utility meter base plate. The substantially parallel relationship provides an advantage of reducing the axial dimensions of the meter 10 without increasing the radial dimensions, which are defined by standard. Reducing the axial dimension of the meter results in overall smaller dimensions of the meters which provides additional cost savings in shipment and storage.

It should be appreciated that the current transformer assembly 22 may also be removed from the utility meter base plate 16 by removing the optional stop member 34 from conduit 60 and rotating the current transformer assembly 22 relative to the utility meter base plate 16 in the direction opposite to the one indicated by arrow 217 such that the tabs 84, 88, and 86 are no longer positioned within the transformer receptacles 38, 40, and 42. It should also be appreciated that the current transformer assembly 24 (see FIG. 2) is secured to the utility meter base plate 16 by utilizing transformer receptacles 44, 46, and 48 (see FIG. 3) in a substantially identical manner as that described above for current transformer assembly 22.

The arrangement for securing the current transformer 80 to the utility meter base plate 16 thus provides the advantage of facilitating assembly of the meter 10 without additional manufacturing steps such as melting a plastic post over the current transformer or pressing a nut onto a plate or metal post. The present invention accomplishes the reduction in manufacturing steps by employing a current transformer assembly that includes at least one tab, such as the tab 84, having a retention surface that engages a corresponding retention surface in a receptacle attached to the utility meter base plate 16. Moreover, the use of elastic deformation to allow the detent 90 (and thus the retention surface) to clear the retention surface in the receptacle during assembly eliminates the need for additional parts to secure the current transformer 80 in position.

In addition, the arrangement for securing the current transformers 22 and 24 according to the present invention also allows removal of the current transformers 22 and 24, if necessary, after the meter 10 has been assembled without destroying any components of the meter 10.

The arrangement for securing the contact blade 26 to the utility meter base plate 16 offers similar advantages as the arrangements for securing than the current coils 30 and 32 and the current transformers 22 and 24 to the utility meter base plate 16. As discussed above, the contact blade 26 is used herein as a neutral blade and is configured to be received by the blade receptacle 76. However, it will be noted that neutral blades in standard utility meters may be located in a plurality of locations. To this end, the utility meter base plate 16 includes two contact blade receptacles 76 and 78, although only one may be used for certain implementations. The blade receptacles 76 and 78 are advantageously positioned within the meter housing to ensure that a contact blade positioned therein is properly aligned with a corresponding socket plug in a one of the plurality of standard neutral blade configurations.

Figure 8:
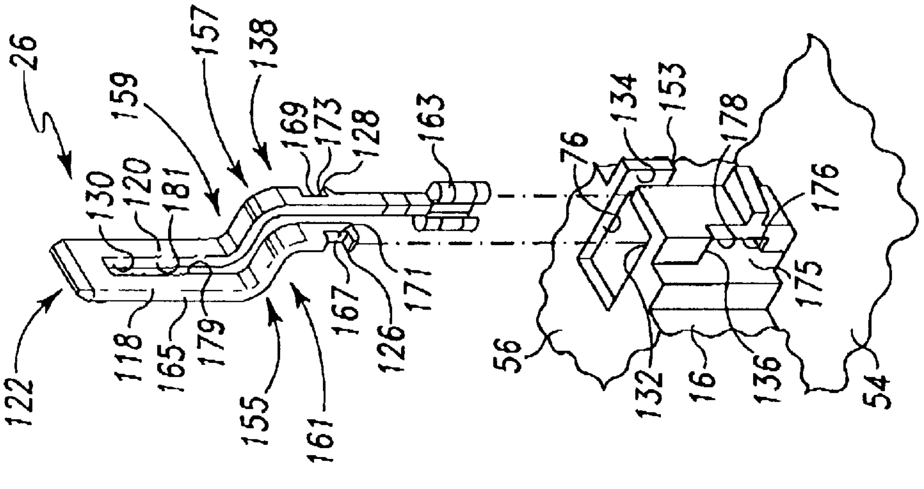
FIG. 8 is a fragmentary perspective view of the utility meter base plate of FIG. 1, showing a blade receptacle and a contact blade positioned above the blade receptacle.

Referring now to FIG. 8, the blade receptacle 76 includes a space 178 defined by a first contact wall 132, a second contact wall 134, a front wall 175, and a rear wall 176. The front wall 175 is disposed opposite the rear wall 176 such that the space 178 is located therebetween. The front wall 175 and the rear wall 176 extend from the upper floor 56 to the lower floor 54. The first contact wall 132 and the second contact wall 134 extend in a spaced-apart parallel manner from the front wall to define a width of the space 178. The defined width of the space 178 corresponds to the width of the current blade 26. The back wall 176 extends from an end of the first contact wall 132 at least partially toward the second contact wall 134.

The first contact wall 132 and the second contact wall 134 furthermore extend downward from the plane defined by the upper floor 56. Specifically, the first contact wall 132 and second contact wall 134 extend partially down toward, but not reaching the lower floor. Such partial downward extension defines a retention shoulder 136 on the first contact wall 132, and a retention shoulder 153 on the second contact wall 134. It should be understood that the blade receptacle 76 further defines an aperture, not shown, through the utility meter base plate 16 such that the first side 193 (see FIG. 2) is in communication with the second side 195 (see FIG. 2) via the blade receptacle 76. The blade receptacle 78 has substantially the same structure in mirror image to the blade receptacle 76.

The contact blade 26 includes a first leg 118 and a second leg 120 that are connected at one end 122. The end 122 is configured have an appropriate width and thickness to be received in an electric utility meter neutral socket plug 191 (see FIG. 2). The dimensions of the electric utility meter socket 191 are defined by standard and are well known in the art.

The legs 118 and 120 of the contact blade 26 extend from the end 122 in a substantially adjacent manner so as to define a slot 130 therebetween. The first leg 118 includes a rounded edge 165 extending outward from the slot 130. The second leg 120 also includes a rounded edge (not shown) which extends outward from the slot 130. The first leg 118 further includes an inner edge 179 which faces inward the slot 130. The second leg 120 also includes an inner edge 181 which faces inward the slot 130. In addition, the leg 118 includes a barb 126 formed thereon, and preferably the leg 120 also includes a barb 128 formed thereon. Each of the barbs 126 and 128 extends outward from the slot 130. A cut away portion 167, which defines a substantially flat edge 171, is formed on the first leg 118 adjacent to the barb 126. In a similar manner, a cut away portion 169, which defines a substantially flat edge 173, is formed on the second leg 120 adjacent to the barb 128. Each of the substantially flat edges 171 and 173 face outward from the slot 130. The flat edges 171 and 173 respectively enhance the structural integrity of the barbs 126 and 128.

The second leg 120 includes a faston electrical connector 163 for providing an electrical connection to the electric utility meter socket plug 124 (see FIG. 2). The contact blade 26 also includes a first bend 159, a second bend 161, and an intermediate segment 157 interposed therebetween. The blade segment 157 defines a stop surface 155 on contact blade 26.

Figure 10:
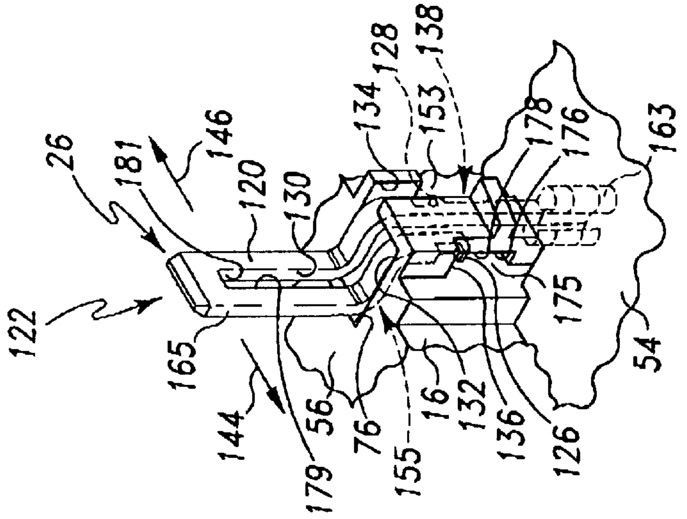
FIG. 10 is a view similar to FIG. 9, but showing the contact blade further advanced into the blade receptacle.
Figure 9:
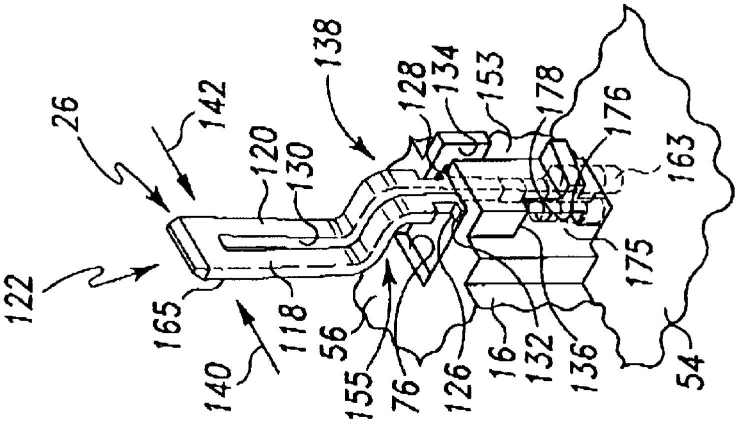
FIG. 9 is a view similar to FIG. 8, but showing the contact blade advanced into the blade receptacle.

Referring now to FIGS. 8, 9, and 10, the contact blade 26 is secured to the utility meter base plate 16 the following manner. The contact blade 26 is aligned with the blade receptacle 76 as shown in FIG. 8. The contact blade 26 is then advanced into the blade receptacle 76 such that (i) the legs 118 and 120 enter into the space 178 and (ii) the barbs 126 and 128 respectively engage the contact walls 132 and 134 as shown in FIG. 9. Having the barbs 126 respectively engage the contact walls 132 and 134 causes the legs 118 and 120 to elastically deform, i.e. the leg 118 is forced to move toward the leg 120 in a direction indicated by the arrow 140, and the leg 120 is forced to move toward the leg 118 in a direction indicated by the arrow 142. It should be understood that elastically deforming the legs 118 and 120 in the above described manner allows the barbs 126 and 128 to clear the contact walls 132 and 134 and thus facilitates the insertion of contact blade 26 into blade receptacle 76.

As shown in FIG. 10, the contact blade 26 is then further advanced into the space 178 of the blade receptacle 76 until (i) the flat edge 171 of leg 118 is adjacent to the retention shoulder 136 and the flat edge 173 of the leg 120 is adjacent to the retention shoulder 153, and (ii) the stop surface 155 of contact blade 26 contacts the upper floor 56 of utility meter base plate 16. Positioning the contact blade 26 in the above described manner allows barbs 126 and 128 to respectively engage the retention shoulders 136 and 153. In particular, as shown in FIG. 10, once the contact blade 26 is positioned in the above described manner, the elastically deformed legs 118 and 120 release to assume substantially their original configuration (i.e. leg 118 moves away from leg 120 in a direction indicated by arrow 144 and leg 120 moves away from leg 118 in a direction indicated by arrow 146), thereby causing the barb 126 to engage the retention shoulder 136 and the barb 128 to engage the retention shoulder 153. The contact between the retention shoulders 136 and 153 and the barbs 126 and 128 secures the contact blade 26 to the utility meter base plate 16.

It should be appreciated that advancing the contact blade 26 into the space 178 of the blade receptacle 76 until the stop surface 155 contacts the upper floor 56 ensures that a predetermined portion 138 of the contact blade 26 is inserted into the space 178. Inserting the appropriate predetermined portion 138 of the contact blade 26 ensures that the barbs 126 and 128 are positioned in the proper position so as to engage the retention shoulders 136 and 153 thereby securing the contact blade 26 to the utility meter base plate 16.

As shown in FIG. 10, it should be understood that securing the contact blade 26 to the utility meter base plate 16 in the above described manner positions the faston 163 such that it may be accessed from the second side 195 (see FIG. 2) of the utility meter base plate 16 the while end 122 of the contact blade 26 remains positioned on the first side 193 of the utility meter base plate 16. Thus, the first side 193 is in electrical communication with the second side 195 (see FIG. 2) via the contact blade 26. As a result, the electric utility meter socket 191 is in electrical communication with the second side 195, where the measurement module 13 is located.

The contact blade 26 may also be removed from the blade receptacle 76 of the utility meter base plate 16 by elastically deforming the legs 118 and 120 inward (i.e. the leg 118 is forced to move toward the leg 120 in a direction indicated by the arrow 140, and the leg 120 is forced to move toward the leg 118 in a direction indicated by the arrow 142) such that the barbs 126 and 128 respectively clear the retention shoulders 136 and 153, and then withdrawing the contact blade 26 from the blade receptacle 76. Once removed from blade receptacle 76, a contact blade having a structure similar to the contact blade 26, but having the mirror image thereof, may be inserted into blade receptacle 78 in a substantially identical manner as that described above for blade receptacle 76. Securing the mirror image contact blade to the utility meter base plate 16 by utilizing blade receptacle 78 rather than blade receptacle 76 provides an alternative contact blade configuration for electric utility meter 10, and thus increases the compatibility of the meter sockets having different neutral blade configurations.

The arrangement for securing the contact blade 26 to the utility meter base plate 16 thus provides the advantage of facilitating assembly without additional parts and manufacturing steps such as those associated with securing a contact blade using bolts or screws. The present invention accomplishes the reduction in manufacturing steps by employing a contact blade having two legs joined at one end, wherein that one end is configured to be received by a standard utility meter socket jaw or plug, and wherein the two legs coextend to form a slot therebetween and at least one leg includes a barb for engaging a retention feature on the utility meter base plate. The slot allows the two legs to elastically deform to facilitate positioning the barb into a position in which it engages the retention feature once the barb engages the retention feature the contact blade is secured to the utility meter base plate.

The arrangement of securing the contact blade 26 according to the present invention also allows removal of the contact blade 26 without destruction of components in the meter 10. Such non-destructive and simplified removal of the contact blade 26 is particularly advantageous in embodiments such as the present embodiment in which the contact blade is employed as a neutral blade. In particular, as discussed above, neutral blades have a plurality of possible configurations that depend on the facility in which the meter is installed. Accordingly, if a meter is moved after installation, there is a possibility that a different neutral blade position will be required by the destination installation. In such a case, the existing contact blade would need to be removed from its current location and another blade (or the same blade) installed at a new location on the utility meter base plate 16.

In any event, once the sensor assembly 20 is secured to the utility meter base plate 16 in the above described manner the back cover plate 18 is attached to the utility meter base plate 16. Attaching back cover plate 18 to the utility meter base plate 16 results in the end 122 of the contact blade 26 extending through a slot 223 (see FIG. 2) defined in the back cover plate 18. The current blades 112*a* and 112*b* of the current coil 30, as well as the current blades of the current coil 32, also extend through corresponding slots in the back cover plate 18. After attaching the back cover 18 to the utility meter base plate 16 in the above described manner, the electric utility meter 10 is positioned with respect to a utility meter socket such that the end 122 of the contact blade 26 is received by the electric utility meter socket plug 191 (see FIG. 2), and the current blades of the current coils 30 and 32 are received by corresponding current jaws, not shown, of a standard utility meter socket.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. In particular, the arrangements for securing the contact blade, the current coils and current transformers to a meter housing may be employed in any standard meter, and thus are not limited to use in modular type meters such as the one described in detail herein. Standard meters generally include both housings and structures that would constitute a base plate or its equivalent. Accordingly, those of ordinary skill in the art could readily modify the arrangements described herein to incorporate those arrangements into the housings of such standard meters.

We claim:

1. An arrangement for securing a current transformer to an electric utility meter housing, comprising:

a utility meter base plate which forms a portion of said utility meter housing, wherein said utility meter base plate includes a transformer receptacle defined therein, said transformer receptacle having an opening and a first retention surface; and a current transformer assembly including (i) said current transformer, (ii) a wall member affixed to said current transformer, and (iii) a tab having a second retention surface, said tab extending from said wall member, wherein said current transformer assembly is secured to said utility meter base plate when said tab is disposed within said transformer receptacle and said first retention surface engages said second retention surface.

2. The arrangement of claim 1, wherein:

said utility meter base plate includes a plurality of said transformer receptacles defined therein and each of said transformer receptacles has an opening and a first retention surface, and said current transformer assembly includes a plurality of said tabs, wherein each of said tabs correspond to one of said transformer receptacles and has a second retention surface for engaging said first retention surface of said corresponding transformer receptacle.

3. The arrangement of claim 1, wherein said tab is integrally formed with said wall member of said current transformer assembly.

4. The arrangement of claim 1, wherein said wall member defines an annular channel and said current transformer is disposed within said annular channel.

5. The arrangement of claim 4, wherein:

said wall member further defines a center aperture for receiving a utility meter current coil therethrough such that said current transformer is disposed in a current sensing relationship with said utility meter current coil.

6. The arrangement of claim 5, wherein:

said utility meter base plate has a first central axis, said annular channel has a second central axis, and said first central axis is substantially parallel with said second central axis when said current transformer is secured to said utility meter base plate.

7. The arrangement of claim 1, wherein:

said transformer receptacle includes a cavity, said cavity has a side wall which defines said first retention surface, and said tab has a detent formed thereon which defines said second retention surface.

8. The arrangement of claim 1, further comprising:

a connector housing extending from said wall member; and a connector disposed within said connector housing and electrically connected to said current transformer.

9. The arrangement of claim 8, wherein said connector housing is integrally formed with said wall member.

10. An arrangement for securing a current transformer to an electric utility meter housing, comprising:

a utility meter base plate which forms a portion of said electric utility meter housing, wherein said utility meter base plate includes (i) a first central axis and (ii) a transformer receptacle defined therein, said transformer receptacle having an opening and a first retention surface;

a current transformer assembly including (i) said current transformer, (ii) a wall member affixed to said current transformer, wherein said wall member defines an annular channel having a second central axis, and said current transformer is positioned within said annular channel, and (iii) a tab having a second retention surface, said tab extending from said wall member, wherein said current transformer assembly is secured to said utility meter base plate, such that said first central axis is substantially parallel with said second central axis, when said tab is disposed within said transformer receptacle so that said first retention surface engages said second retention surface.

11. The arrangement of claim 10, wherein:

said utility meter base plate includes a plurality of transformer receptacles defined therein and each of said transformer receptacles has an opening and a first retention surface, and said current transformer assembly includes a plurality of tabs, wherein each of said tabs correspond to one of said transformer receptacles and has a second retention surface for engaging said first retention surface of said corresponding transformer receptacle.

12. The arrangement of claim 10, wherein said tab is integrally formed with said wall member of said current transformer assembly.

13. The arrangement of claim 10, wherein:

said wall member further defines a center aperture for receiving a utility meter current coil therethrough such that said current transformer is disposed in a current sensing relationship with said utility meter current coil.

14. The arrangement of claim 10, wherein:

said transformer receptacle includes a cavity, said cavity has a side wall which defines said first retention surface, and said tab has a detent formed thereon which defines said second retention surface.

15. The arrangement of claim 10, further comprising:

a connector housing extending from said wall member; and a connector disposed within said connector housing and electrically coupled to said current transformer.

16. The arrangement of claim 15, wherein said connector housing is integrally formed with said wall member.

17. A method of securing a current transformer to an electric utility meter housing having a base plate, said base plate having a transformer receptacle defined therein, said transformer receptacle including an opening and a first retention surface, said current transformer disposed within a current transformer assembly that includes a wall member affixed to said current transformer and a tab extending from said wall member, said tab including a second retention surface, the method comprising:

positioning said current transformer assembly such that said tab is disposed proximate said opening;

effecting movement of said current transformer assembly such that said tab traverses said opening; and causing elastic deformation of at least one of said tab and said transformer receptacle to facilitate traversal of said opening by said tab so as to position said tab in said transformer receptacle such that (i) said first retention surface engages said second retention surface and (ii) said current transformer assembly is secured to said utility meter base plate.

* * * * *